(12) United States Patent
Achten et al.

(10) Patent No.: US 10,974,498 B2
(45) Date of Patent: Apr. 13, 2021

(54) ADDITIVE FABRICATION PROCESS WITH A STRUCTURAL MATERIAL COMPRISING AN IR ABSORBER

(71) Applicant: Covestro Deutschland AG, Leverkusen (DE)

(72) Inventors: Dirk Achten, Leverkusen (DE);
Thomas Büsgen, Leverkusen (DE);
Rolf Wehrmann, Krefeld (DE);
Helmut Werner Heuer, Siegen (DE)

(73) Assignee: Covestro Deutschland AG, Leverkusen (DE)

( * ) Notice: Subject to any disclaimer, the term of this patent is extended or adjusted under 35 U.S.C. 154(b) by 68 days.

(21) Appl. No.: 16/474,152

(22) PCT Filed: Dec. 22, 2017

(86) PCT No.: PCT/EP2017/084286
§ 371 (c)(1),
(2) Date: Jun. 27, 2019

(87) PCT Pub. No.: WO2018/122142
PCT Pub. Date: Jul. 5, 2018

(65) Prior Publication Data
US 2019/0344555 A1    Nov. 14, 2019

(30) Foreign Application Priority Data

Dec. 28, 2016 (EP) ..................................... 16207138
Dec. 28, 2016 (EP) ..................................... 16207145

(51) Int. Cl.
| | |
|---|---|
| *B33Y 80/00* | (2015.01) |
| *B29C 64/118* | (2017.01) |
| *B29C 64/153* | (2017.01) |
| *B01D 71/50* | (2006.01) |
| *B29C 35/08* | (2006.01) |
| *B29K 105/00* | (2006.01) |

(52) U.S. Cl.
CPC ............ *B33Y 80/00* (2014.12); *B29C 64/118* (2017.08); *B01D 71/50* (2013.01); *B29C 64/153* (2017.08); *B29C 2035/0822* (2013.01); *B29K 2105/0067* (2013.01)

(58) Field of Classification Search
CPC ....................................................... B33Y 80/00
See application file for complete search history.

(56) References Cited

U.S. PATENT DOCUMENTS

| | | |
|---|---|---|
| 2,991,273 A | 7/1961 | Hechelhammer et al. |
| 2,999,825 A | 9/1961 | Floyd et al. |
| 2,999,846 A | 9/1961 | Schnell et al. |
| 3,028,365 A | 4/1962 | Schnell et al. |
| 3,148,172 A | 9/1964 | Fox |
| 3,271,367 A | 9/1966 | Schnell et al. |
| 3,879,348 A | 4/1975 | Serini et al. |
| 4,982,014 A | 1/1991 | Freitag et al. |
| 8,083,847 B2 | 12/2011 | Takeda et al. |
| 9,029,440 B2 | 5/2015 | Meyer et al. |
| 9,074,071 B2 | 7/2015 | Fujita |
| 9,651,712 B2 | 5/2017 | Erkelenz et al. |
| 2005/0161642 A1 | 7/2005 | Takeda |
| 2015/0028523 A1 | 1/2015 | Jaker et al. |

FOREIGN PATENT DOCUMENTS

| | | |
|---|---|---|
| CA | 2371181 A1 | 11/2000 |
| CA | 2371181 | * 10/2001 |

(Continued)

OTHER PUBLICATIONS

International Search Report for PCT/EP2017/084286 dated Mar. 16, 2018.

(Continued)

*Primary Examiner* — Larry W Thrower
(74) *Attorney, Agent, or Firm* — Jed C. Benson

(57) ABSTRACT

A process for manufacturing an article, comprising the step of manufacturing the article via an additive fabrication process from a structural material, is notable in that the structural material comprises a polymer selected from the following group: (co)polycarbonates, polyesters, polyestercarbonates, polyformals, polyamides, polyethers, polyvinyl chloride, polymethyl (meth)acrylate, polystyrene or a combination of at least two thereof and an additive absorbing infrared radiation. The additive absorbing infrared radiation is selected for its chemical structure and its concentration in the structural material such that it reduces transmission by the structural material of light in the wavelength range between 600 nm and 1700 nm, determined on a sample 100 µm thick, by ≥2.5 percentage points relative to a structural material sample with a thickness of 100 µm that does not contain the additive absorbing infrared radiation. During the additive fabrication process the structural material is exposed at least temporarily to infrared radiation in the wavelength range between 600 nm and 1700 nm. An article obtainable by a process as described above is notable for its production from a structural material which comprises a polymer selected from the following group: (co)polycarbonates, polyesters, polyestercarbonates, polyformals, polyamides, polyethers, polyvinyl chloride, polymethyl (meth)acrylate, polystyrene or a combination of at least two thereof and an additive absorbing infrared radiation, where the article, in the direction of its construction in the additive manufacturing process used to make it, has a tensile strength (ISO 527) which is >30% to . . . 100% of the tensile strength (ISO 527) of a specimen injection-moulded from the same structural material.

8 Claims, No Drawings

(56) References Cited

FOREIGN PATENT DOCUMENTS

| | | |
|---|---|---|
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3832396 A1 | 2/1990 |
| DE | 19918981 A1 | 11/2000 |
| DE | 10392543 T5 | 4/2005 |
| EP | 1559743 A1 | 8/2005 |
| FR | 1561518 A | 3/1969 |
| GB | 1122003 A | 7/1968 |
| GB | 1229482 A | 4/1971 |
| GB | 1367790 A | 9/1974 |
| JP | S6162039 A | 3/1986 |
| JP | S6162040 A | 3/1986 |
| JP | S61105550 A | 5/1986 |
| JP | 2006219662 A | 8/2006 |
| JP | 2008024902 A | 2/2008 |
| JP | 2008150548 A | 7/2008 |
| JP | 2008214596 A | 9/2008 |
| WO | WO/2000/64653 | * 11/2000 |
| WO | WO-2005037932 A1 | 4/2005 |
| WO | WO-2005090056 A1 | 9/2005 |
| WO | WO-2009059901 A2 | 5/2009 |
| WO | WO-2010090893 A1 | 8/2010 |
| WO | WO-2012080397 A2 | 6/2012 |
| WO | WO-2013057074 A1 | 4/2013 |
| WO | WO-2015077053 A1 | 5/2015 |
| WO | WO-2015193818 A1 | 12/2015 |
| WO | WO 2015193819 A2 | 12/2015 |
| WO | WO-2015195527 A1 | 12/2015 |
| WO | WO-2016134224 A1 | 8/2016 |

OTHER PUBLICATIONS

Written Opinion of the International Searching Authority for PCT/EP2017/084286 dated Mar. 16, 2018.

* cited by examiner

ADDITIVE FABRICATION PROCESS WITH A STRUCTURAL MATERIAL COMPRISING AN IR ABSORBER

CROSS-REFERENCE TO RELATED APPLICATIONS

This application is a national stage application (under 35 U.S.C. § 371) of PCT/EP2017/084286, filed Dec. 22, 2017, which claims benefit of European Application Nos. 16207138.5 and 16207145.0, both filed Dec. 28, 2016, all of which are incorporated herein by reference in their entirety.

The present invention relates to a process for producing an article, comprising the step of producing the article by means of an additive manufacturing process from a construction material, wherein the construction material comprises a polymer selected from the group of: (co)polycarbonates, polyesters, polyestercarbonates, polyformals, polyamides, polyethers, polyvinylchloride, polymethyl (meth)acrylate, polystyrene or a combination of at least two of these and an additive that absorbs infrared radiation.

The use of polycarbonates in additive manufacturing methods ("3D printing methods") is known in principle. For instance, WO 2015/077053 A1 discloses an article having reduced density, comprising a thermoplastic polycarbonate composition. The article has a density (ASTM D792-00) of 80% to 99%, based on the weight of a similar solid injection molding without voids. In addition, the article has a microstructure, determined by optical microscopy, with 1% by volume to 20% by volume of voids, wherein at least 80% of the voids are those having a high ratio of length to width and less than 20% by weight of the voids are spherical cavities having a diameter between 10 and 100 micrometers. The thermoplastic polycarbonate composition comprises at least 50 mol % bisphenol A and has weight-average molecular weight ($M_w$) of 10 000 to 50 000, a glass transition temperature Tg of 130° C. to 180° C., a content of phenolic OH groups of less than 50 ppm, a halogen group content of below 100 ppm and a diary) carbonate content of less than 1% by weight. The article is manufactured by means of a monofilament-based additive manufacturing technique.

WO 2015/195527 A1 relates to a process for producing a thermoplastic article in which a multitude of layers of a thermoplastic material is laid out in a predetermined pattern in order to form the article. The thermoplastic material comprises a thermoplastic composition having a melt flow index of 30 grams/10 minutes to 75 grams/10 minutes to ASTM D1238-04 at either 230° C. at 3.8 kg or at 300° C. and 1.2 kg. The thermoplastic material may be a polycarbonate homopolymer, a polycarbonate copolymer, a polyester or a combination thereof.

WO 2015/193818 A1 discloses a process for producing an article, in which one or more layers of an extruded material in the molten state are laid out in a predetermined pattern, wherein at least one of the layers is formed from a construction material. The construction material is exposed to an effective dose of ultraviolet radiation in order to trigger crosslinking within the article. The construction material here is a polymeric composition comprising a crosslinkable polycarbonate resin with a photoactive group derived front benzophenone.

WO 2010/090893 A1 is concerned with passive ways of reducing the heating of interior spaces by insolation and relates to a transparent multilayer article having a core layer comprising thermoplastic carbonate polymers, a first layer comprising a thermoplastic carbonate polymer and an infrared (IR)-absorbing additive and a second layer comprising a thermoplastic carbonate polymer and an ultraviolet (UV) stabilizer. The first layer does not contain any UV-absorbing additive and the second layer does not contain any IR-absorbing additive.

WO 2013/057074 A1 relates to polymer compositions for production of molded articles, especially spectacles and eye protection devices, that meet the standards of EN 169 (welder protection standard) and of EN 1836/2005 (signal light recognition). What is described as a heat-absorbing thermoplastic molding compound comprising: A) 73.9750% to 99.9948% by weight of at least one transparent thermoplastic; B) 0.05% to 0.50% of at least one UV stabilizer; C) 0 part by weight to 1.00 part by weight of at least one demolding agent; D) 0.0001% to 0.500%, of at least one inorganic UV absorber, excluding carbon black, based on the pure inorganic IR absorber; E) 0% to 0.01% by weight of at least one organic IR absorber; F) 0% to 0.0150% of carbon black; G) 0% to 1.0% of at least one thermal stabilizer; H) 0% to 7.0% of at least one flame retardant; I) 0% to 15.00% by weight of further additives and K) 0.0001% to 1.000% by weight of at least one organic colorant or organic colorant complexes, where the sum total of the proportions by weight of components A to K adds up to 100% by weight. The thermoplastic may be polycarbonate.

WO 2012/080397 A2 discloses an infrared radiation (IR)-absorbing polymer composition comprising a transparent thermoplastic, an inorganic infrared absorber, also referred to hereinafter as IR absorber, optionally an inorganic nanoscale pigment and the combination of at least one organic element of specific structure, and the production and use of the polymer compositions and the products produced therefrom.

WO 2005/090056 A1 relates to a pulverulent composition for processing in a method for layer-by-layer construction of three-dimensional articles by means of a laser, in which regions of the respective powder layer are selectively melted, wherein the powder includes at least one polymer and at least one absorber, wherein a laser having a wavelength between 100 and 3000 nm may be used.

WO 2016/134224 A1 describes a process for producing spherical polymer particles which may comprise IR absorbers. An article produced therefrom may be a 3D-printed article.

Polycarbonates have a low degree of crystallinity, a comparatively high melting temperature and a glass transition temperature well above room temperature. However, this combination of properties entails specific challenges for the use of polycarbonates in additive manufacturing methods. These are especially the adhesion of individual strand or particle layers to one another. It may be the case that polymer chains of one layer are no longer able to intermesh with polymer chains of a preceding layer. It may also be the case that the preceding layer has already cooled to such an extent that heat transfer between the layer just applied and the preceding layer is insufficient to bring about satisfactory adhesion of the layers by virtue of the inherent cohesive properties of the material.

It is an object of the present invention to at least partly overcome at least one disadvantage of the prior art. It is a further object of the present invention to specify an additive manufacturing method by which polycarbonate-based construction materials can be processed with improved adhesion of the individual layers to one another.

The object is achieved in accordance with the invention by a process as claimed in claim 1. An article obtainable by the process of the invention is claimed in claim 12. Advantageous developments are specified in the subsidiary claims. They may be combined as desired, unless the opposite is apparent from the context.

The object is also achieved in accordance with the invention by a process for producing an article, comprising the step of producing the article by means of the additive manufacturing method from a construction material, having the feature that the construction material is a polymer selected from the group of: (co)polycarbonates, polyesters, polyestercarbonates, polyformals, polyamides, polyethers, polyvinylchloride, polymethyl(meth)acrylate, polystyrene or a combination of at least two of these, and an additive that absorbs infrared radiation, wherein the additive that absorbs infrared radiation is present in the construction material in an amount of ≥0.0005% and ≤5.0% by weight, and wherein, during the additive manufacturing method, the construction material is at least temporarily exposed to infrared radiation in the wavelength range between 600 nm and 1700 nm.

A process for producing an article, comprising the step of producing the article by means of the additive manufacturing method from a construction material, has the feature that the construction material is a polymer selected from the group of: (co)polycarbonates, polyesters, polyestercarbonates, polyformals, polyamides, polyethers, polyvinylchloride, polymethyl(meth)acrylate, polystyrene or a combination of at least two of these, and an additive that absorbs infrared radiation, wherein the additive that absorbs infrared radiation, in terms of its chemical structure and its concentration in the construction material, is selected such that it reduces the transmittance of the construction material for light in the wavelength range between 600 nm and 1700 nm, determined on a 100 µm-thick sample, by ≥2.5 percentage points compared to a sample of the construction material having a thickness of 100 µm that does not contain the additive that absorbs infrared radiation. During the additive manufacturing method, the construction material is at least temporarily exposed to infrared radiation in the wavelength range between 600 nm and 1700 nm.

The article to be produced may be the sole aim of the production process. Alternatively, it is possible that the article to be produced is part of an larger composite and the production thereof constitutes a component step in the production of the composite.

According to the invention, the article is produced by means of the additive manufacturing method ("3D printing") from a construction material. The additive manufacturing method may be selected, for example, from melt coating (fused filament fabrication, FFF, or fused deposition modelling, FDM), selective laser sintering, selective laser melting and high-speed sintering.

The term "melt coating method" refers to a manufacturing method from the field of additive manufacturing, with which a workpiece is formed layer by layer, for example from a fusible plastic. The plastic may be used with or without further additions such as fibers. Machines for FDM/FFF form part of the machine class of 3D printers. This method is based on the liquefaction of a plastic or wax material in wire form by heating. The material solidifies in the course of final cooling. The material is applied by extrusion with a heating nozzle which is freely movable in relation to a manufacturing plane. It is possible here either for the manufacturing plane to be fixed and for the nozzle to be freely movable or for a nozzle to be fixed and a substrate table (with a manufacturing plane) to be moved, or for both elements, the nozzle and manufacturing plane, to be movable. The speed with which the substrate and nozzle are movable with respect to one another is preferably within a range from 1 to 200 mm/s. According to the application, the layer thickness is within a range from 0.025 and 1.25 mm, and the exit diameter of the jet of material (nozzle outlet diameter) of the nozzle is typically at least 0.05 mm.

In layer-by-layer model production, the individual layers are thus bonded to form a complex part. A body is typically constructed by repeatedly tracing a working plane line by line (forming a layer) and then moving the working plane upward in a "stacking" manner (forming at least one further layer atop the first layer), so as to form a shape layer by layer. The exit temperature of the mixtures of material from the nozzle may, for example, be 80° C. to 420° C. It is additionally possible to heat the substrate table and/or any construction space present, for example to 20° C. to 250° C. This can prevent excessively rapid cooling of the layer applied, such that a further layer applied thereto bonds adequately to the first layer.

In the context of the present invention, sintering methods are methods which especially utilize thermoplastic powders in order to construct articles layer by layer. In this case, by means of what is called a coater, thin layers of powder are applied and then selectively melted by means of an energy source. The surrounding powder here supports the component geometry. Complex geometries can thus be manufactured more economically than in the FDM method. Moreover, different articles can be arranged or manufactured in a tightly packed manner in what is called the powder bed. Owing to these advantages, powder-based additive manufacturing methods are among the most economically viable additive manufacturing methods on the market. They are therefore the processes that are predominantly used by industrial users. Examples of powder-based additive manufacturing methods are what are called selective laser sintering (SLS) or high-speed sintering (HSS). They differ from one another in the method for introducing into the plastic the energy for the selective melting. In the laser sintering method, the energy is introduced via a deflected laser beam. In what is called the high-speed sintering (HSS) method, the energy is introduced via infrared (IR) sources in combination with an IR absorber selectively printed into the powder bed. What is called selective heat sintering (SHS) utilizes the printing unit of a conventional thermal printer in order to selectively melt thermoplastic powders. Preference is given to selective laser sintering methods (SLS).

According to the invention, it is also the case that the construction material comprises a polymer from the aforementioned group and an additive that absorbs infrared radiation. The additive that absorbs infrared radiation ("IR absorber") serves to keep the temperature of the polymer within a range beneficial for adhesion to further polymer, or to slow the cooling of the polymer.

During the additive manufacturing method, the construction material is at least temporarily exposed to infrared radiation in the wavelength range between 600 nm and 1700 nm. In this case, it is not necessary for the entire wavelength range mentioned to be covered, provided that absorption of the IR radiation by the absorber takes place and hence the polymer is heated. For example, the wavelength range of a $CO_2$ laser (≥940 nm to ≤1060 nm) may be selected.

The infrared radiation may be introduced into the construction material by means of an IR radiation source. A previously deposited layer of the construction material, by means of the IR absorber present in conjunction with thermal radiation present in any case or with thermal radiation introduced deliberately, can be kept at such a temperature that the current position of the construction material bonds therewith with development of good adhesion.

More particularly, the construction material of a previously deposited layer of the construction material can be kept at a temperature above the starting point of the glass transition temperature of the construction material.

The process can be conducted in such a way that a construction chamber in which the article is constructed has to be heated only to a lesser degree, if at all. In that case, it is possible to reduce or entirely avoid thermal component deformations ("warping").

The IR radiation-absorbing additive, in terms of its chemical structure and its concentration in the construction material, in a first subject of the invention, is selected such that it reduces the transmittance (defined as the ratio of the intensities of the light before and after passing through the sample) of the construction material for light in the wavelength range between 600 nm and 1700 nm, determined on a 100 µm-thick sample, by ≥2.5 percentage points, preferably ≥5 percentage points, preferably ≥10 percentage points, preferably ≥15 percentage points and more preferably ≥20 percentage points compared to a sample of the construction material having a thickness of 100 µm that does not contain the infrared radiation-absorbing additive. The transmittance measurements can be conducted with a spectrophotometer having a photometer sphere to ISO 13468-2. The IR radiation-absorbing additive may be a single substance or a mixture of two or more compounds that absorb IR radiation.

Thus, the selection of a suitable IR absorber can preferably be accomplished by first determining the transmittance of a 100 µm-thick sample for light in the wavelength range between 600 nm and 1700 nm, preferably 800 nm and 1100 nm (near IR). This sample consists of the construction material but does not contain any IR absorber. In this case, the result obtained may be that transmittance in the wavelength range examined is not more than 85% and not less than 80%. Subsequently, a 100 µm-thick sample of the construction material including IR absorber is analyzed by the same method with regard to transmittance in the wavelength range examined. In this case, the result obtained may be that transmittance in this wavelength range is not more than 35% and not less than 30%. In that case, the added IR absorber has reduced the transmittance of the construction material in the wavelength range in question by at most 85−30=55 percentage points and by at least 80−35=45 percentage points. Such an illustrative IR absorber would be suitable in accordance with the invention.

Useful IR absorbers include inorganic and organic compounds and carbon black. The IR absorbers are preferably selected from the group consisting of borides, tungstates, mixtures of at least one boride and at least one tungstate, carbon black, organic IR absorbers or a combination of at least two of these. The concentration of IR absorber may, for example, be ≥0.0005% to ≤3.0% by weight, based on the total weight of the construction material. This concentration is preferably ≥0.005% to ≤2.5% by weight, more preferably ≥0.01% to ≤2% by weight.

Polymers envisaged in accordance with the invention in the construction material are (co)polycarbonate (PC), polyesters, polyestercarbonates, polyformals, polyamides (PA), polyethers, polyvinylchloride (PVC), polymethyl(meth)acrylate (PMMA), polystyrene (PS) or a combination of at least two of these. Such polymers can be characterized as very substantially amorphous polymers having a high glass transition temperature. A preferred construction material here is a polycarbonate polymer.

Polycarbonate (PC) polymers may be either homopolycarbonates or copolycarbonates; the polycarbonates may be linear or branched in a known manner. According to the invention, it is also possible to use mixtures of polycarbonates. The polycarbonates may be aromatic, aliphatic or mixed aromatic/aliphatic polycarbonate polymers. The polycarbonates are prepared in a known manner from diols, carbonic acid derivatives, and optionally chain terminators and branching agents.

Details of the preparation of polycarbonates have been set out in many patent specifications. Reference may be made here to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne, BAYER AG, "Polycarbonates" in Encyclopedia of Polymer Science and Engineering, Volume 11, Second Edition, 1988, pages 648-718 and finally to U. Grigo, K. Kirchner and P. R. Müller "Polycarbonate" [Polycarbonates] in Becker/Braun, Kunststoff-Handbuch [Plastics Handbook], volume 3/1, Polycarbonate, Polyacetale, Polyester, Celluloseester [Polycarbonates, Polyacetals, Polyesters, Cellulose Esters], Carl Hanser Verlag Munich, Vienna 1992, pages 117-299. Aromatic polycarbonates are prepared, for example, by reacting diphenols with carbonic halides, preferably phosgene, and/or with aromatic dicarbonyl dihalides, preferably benzenedicarbonyl dihalides, by the interfacial process, optionally using chain terminators and optionally using trifunctional or more than trifunctional branching agents. Preparation via a melt polymerization process by reaction of diphenols with diphenyl carbonate, for example, is likewise possible.

Diphenols suitable for the preparation of polycarbonates are, for example, hydroquinone, resorcinol, dihydroxydiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes, phthalimidines derived from isatin derivatives or from phenolphthalein derivatives, and also the related ring-alkylated, ring-arylated and ring-halogenated compounds. Preferred diphenols are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A. These and other suitable diphenols are described, for example, in U.S. Pat. Nos. 3,028,635, 2,999,825, 3,148,172, 2,991,273, 3,271,367, 4,982,014 and 2,999,846, in DE-A 1 570 703, DE-A 2 063 050, DE-A 2 036 052, DE-A 2 21 1 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

Suitable aliphatic diols are especially those of the formula H[O-T-]$_n$-OH where n is a number between 1 and 100, preferably 1 to 80 and more preferably 1 to 45, and T is a branched or linear, saturated or unsaturated alkyl or cycloalkyl moiety having 3 to 20 carbon atoms. Preference is given to saturated linear alkyl diols having 3 to 15 carbon atoms, more preferably having 3-10 carbon atoms, even more preferably having 6-10 carbon atoms and especially also 7-10 carbon atoms.

Nonexclusive examples include heptane-1,7-diol, octane-1,8-diol, hexane-1,6-diol, pentane-1,5-diol, butane-1,4-diol, propane-1,3-diol, 2-methylpropane-1,3-diol, 3-methylpentane-1,5-diol, 2-methylpentanediol, 2,2,4-trimethylhexane-1,6-diol, 2-ethylhexane-1,6-diol, 2,3,5-trimethylhexane-1,6-diol, cyclohexanedimethanol, neopentyl glycol and polyethylene glycol, polypropylene glycol, polybutylene glycol and polyetherpolyols that have been obtained by copolymerization of ethylene oxide and propylene oxide, for example, or polytetramethylene glycol that has been obtained by ring-opening polymerization of tetrahydrofuran (THF), di-, tri- and tetrahexyl ether glycol, and mixtures of different diols.

In addition, it is possible to use addition products of the diets with lactones (ester diols), for example caprolactone, valerolactam, etc., and mixtures of the diols with lactones, with no need for any initial transesterification of lactones and diols.

It is also possible to use the addition products of the diols described as dicarboxylic acids, for example: adipic acid, glutaric acid, succinic acid malonic acid etc., or esters of the dicarboxylic acids and mixtures of the diols with dicarboxylic acids or esters of the dicarboxylic acids, with no need for any initial transesterification of dicarboxylic acid and the diols. It is also possible to use mixtures of different diols, lactones and dicarboxylic acids.

Aliphatic diols used are preferably hexane-1,6-diol, pentane-1,5-diol and mixtures of hexane-1,6-diol and caprolactone.

Only one diol is used in the case of the homopolycarbonates; two or more diols are used in the case of copolycarbonates.

Examples of suitable carbonic acid derivatives include phosgene or diphenyl carbonate.

Suitable chain terminators that may be used in the preparation of the polycarbonates are monophenols. Examples of suitable monophenols include phenol itself, alkylphenols such as cresols, p-tert-butylphenol, cumylphenol or mixtures of at least two of these. Preferred chain terminators are the phenols mono- or polysubstituted by linear or branched C1- to C30-alkyl radicals, preferably unsubstituted or tert-butyl-substituted. Particularly preferred chain terminators are phenol, cumylphenol and/or p-tert-butylphenol.

The amount of chain terminator to be used is preferably 0.1 to 5 mol %, based on moles of diols used in each case. The chain terminators can be added before, during or after the reaction with a carbonic acid derivative.

Suitable branching agents are the trifunctional or more than trifunctional compounds familiar in polycarbonate chemistry, in particular those having three or more than three phenolic OH groups. Examples of suitable branching agents include 1,3,5-tri(4-hydroxyphenyl)benzene, 1,1,1-tri(4-hydroxyphenyl)ethane, tri(4-hydroxyphenyl)phenyl methane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra(4-(4-hydroxyphenylisopropyl)phenoxy) methane and 1,4-bis((4',4"-dihydroxytriphenyl)methyl) benzene and 3,3-bis(3-methyl-4-hydroxyphenyl)-2-oxo-2,3-dihydroindole.

The amount of any branching agents to be used is preferably 0.05 mol % to 2.00 mol %, based on moles of diols used in each case.

The branching agents can either be initially charged with the diols and the chain terminators in the aqueous alkaline phase or added dissolved in an organic solvent prior to the phosgenation. In the case of the transesterification process, the branching agents are used together with the diols.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

For incorporation of additives, the polycarbonate powder is preferably used in the form of powders, granules or mixtures of powders and granules. The construction material may comprise further additives and/or fillers (for example glass or carbon fibers, silicates, talc, titanium dioxide, or barium sulfate), demolding agents and/or flame retardants, organic and inorganic light-scattering agents, stabilizers (for example thermal stabilizers and/or light stabilizers) and the like, but also further polymers. The total content of additives in the construction material may, for example, be ≥0.01% by weight to ≤10% by weight, preferably ≥0.1% by weight to ≤8% by weight, more preferably 6% by weight. The content of fillers in the construction material may, for example, be ≥0.0% by weight to ≤50% by weight, preferably ≥3% by weight to ≤40% by weight.

In a preferred embodiment, the additive that absorbs infrared radiation is present at the surface of the construction material. It may be applied to the surface of the construction material, for example, by mixing with a particulate construction material or by coating of an FDM filament.

In a further preferred embodiment, the additive that absorbs infrared radiation is distributed within the construction material. The additive that absorbs IR radiation may especially be distributed homogeneously in the construction material. In the present invention, the finely divided IR absorber particles are preferably introduced into the polymer matrix in the form of a dispersion. This dispersion prevents reagglomeration and facilitates incorporation into a thermoplastic polycarbonate matrix. Polymeric dispersants are used with preference. Suitable polymer-based dispersants are in particular dispersants that have high light transmittance, for example polyacrylates, polyurethanes, polyethers or polyesters and polymers derived therefrom. Preferred dispersants are polyacrylates, polyethers and polyester-based polymers. Preference is given to using dispersants of high thermal stability.

For production of inorganic IR absorber nanoparticles, the IR absorber may be mixed with the dispersants described below and further organic solvents, for example toluene, benzene or similar aromatic hydrocarbons, and ground in suitable mills, for example ball mills, with addition of zirconia (for example having a diameter of 0.3 mm), in order to produce the desired particle size distribution. The nanoparticles are obtained in the form of a dispersion. After grinding, it is optionally possible to add further dispersants. The solvent is removed at elevated temperatures and reduced pressure.

The size of the particles can be determined with the aid of transmission electron microscopy (TEM). Measurements of this kind on IR absorber nanoparticles are described, for example, in Adachi et al., J. Am. Ceram. Soc. 2008, 91, 2897-2902.

For use in transparent thermoplastics, the particles thus obtained can be dispersed in an organic matrix, for example in a polycarbonate, and optionally ground as described above in a mill using suitable auxiliaries, for example zirconium dioxide, and optionally using organic solvents, for example toluene, benzene or similar hydrocarbons.

Suitable polymer-based dispersants are in particular dispersants that have high light transmittance, for example polyacrylates, polyurethanes, polyethers, polyesters or polyesterurethanes and polymers derived therefrom.

Preferred dispersants are polyacrylates, polyethers and polyester-based polymers, and particularly preferred dispersants of high thermal stability are polyacrylates, for example polymethylmethacrylate or polymethylmethacrylate (collectively named polymethyl(meth)acrylate), and polyesters. It is also possible to use mixtures of these polymers or else copolymers based on acrylate. Dispersing auxiliaries of this kind and methods for production of tungstate dispersions are described, for example, in JP 2008214596 and in Adachi et al. J. Am. Ceram. Soc. 2007, 90 4059-4061.

Suitable dispersants are commercially available. Especially suitable are polyacrylate-based dispersants. Suitable dispersants of this kind are available, for example, under the EFKA® trade names, e.g. EFKA® 4500 and EFKA® 4530, from BASF SE, Ludwigshafen, Germany. Polyester-containing dispersants are likewise suitable. They are available, for example, under the Solsperse® trade name, e.g. Solsperse® 22000, 24000SC, 26000, 27000, from Avecia. Also known as polyether-containing dispersants, for example under the Disparlon® DA234 and DA325 trade names from Kusumoto Chemicals. Polyurethane-based systems are also suitable. Polyurethane-based systems are available under the EFKA® 4046, EFKA® 4047 trade name from BASF Ludwigshafen. Texaphor® P60 and P63 are corresponding trade names of Cognis/BASF SE, Germany.

The amount of the IR absorber in the dispersant may be 0.2% by weight to 80.0% by weight, preferably 1.0% by weight-40.0% by weight, further preferably 5% by weight-35% by weight and most preferably 10% by weight-30% by weight, based on the dispersion of the inorganic IR absorber used. The overall composition of the ready-to-use IR absorber formulation may include, as well as the pure IR absorber material and the dispersant, further auxiliaries, for example zirconium dioxide, and residual solvents, for example toluene, benzene or similar aromatic hydrocarbons.

In a further preferred embodiment, the additive that absorbs infrared radiation is selected from the group of: borides, tungstates, mixtures of at least one boride and at least one tungstate, carbon black, organic IR absorbers or a combination of at least two of these.

Suitable inorganic IR absorbers are especially materials based on finely divided borides, for example lanthanum hexaboride, since they have a broad absorption band. Borides of this kind based on La, Ce, Pr, Nd, Tb, Dy, Ho, Y, Sm, Eu, Er, Tm, Yb, Lu, Sr, Ti, Zr, Hf, V, Ta, Cr, Mo, W and Ca are described, for example, in DE 10392543 or EP 1 559 743.

Also known are IR-absorbing additives from the group of the tungsten compounds that have lower intrinsic absorption in the visible spectral region compared to the inorganic boride-based IR absorbers known from the prior art, and particular preference is given to using especially zinc-doped tungsten compounds having elevated long-term stability.

Among the inorganic IR absorbers, preference is given especially to lanthanum hexaboride and cesium tungstates, and also zinc-doped cesium tungstates.

The preparation and use of these absorbers in thermoplastic materials is described, for example, in H. Takeda, K. Adachi, J. Am. Ceram. Soc. 90, 4059-4061 (2007), WO 2005037932, JP 2006219662, JP 2008024902, JP 2008150548, WO 2009/059901 and JP 2008214596.

Tungsten-based IR absorbers are preferably IR absorbers of the following type:

b1) $W_yO_z$ (W=tungsten, O=oxygen; z/y=2.20-2.99) and/or b2) $M_xW_yO_z$ (M=H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0), where elements preferred as M are H, Cs, Rb, K, Tl, In, Ba, Li, Ca, Sr, Fe and Sn, among which very particular preference is given to Cs. Particular preference is given to $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, and mixtures thereof. In a preferred embodiment of the present invention, the sole use of $Cs_{0.33}WO_3$ as inorganic IR absorber is very particularly preferred. Likewise preferred are Cs/W ratios of 0.20 and 0.25, and the aforementioned tungsten compounds of the b1) and b2) type are referred to hereinafter as tungstates.

A further preferred embodiment with doped tungstates involve substances of the $Zn_wM_xW_yO_z$ type (M=at least one element selected from the group consisting of H, He, alkali metal, alkaline earth metal, metal from the group of the rare earths, Mg, Zr, Cr, Mn, Fe, Ru, Co, Rh, Ir, Ni, Pd, Pt, Cu, Ag, Au, Cd, Al, Ga, In, Tl, Si, Ge, Sn, Pb, Sb, B, F, P, S, Se, Br, Te, Ti, Nb, V, Mo, Ta, Re, Be, Hf, Os, Bi; x/y=0.001-1.000; z/y=2.2-3.0; w=0.001-0.015), where elements preferred as M are H, Cs, Rb, K, Tl, In, Ba, Li, Ca, Sr, Fe and Sn, among which very particular preference is given to Cs. Particular preference is further given to zinc-doped $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$, and mixtures thereof.

If boride-based IR absorbers are used, preference is given to nanoscale inorganic boride-based IR absorber particles, preferably a metal boride, where the metal is selected from the group of the following elements: La, Ce, Pr, Nd, Tb, Dy, Ho, Y, Sm, Eu, ER, Tm, Yb, Lu, Sr, Ti, Zr, Hf, V, Ta, Cr, Mo, W and Ca. The hexaboride form is particularly preferred. Especially preferred are lanthanum hexaboride ($LaB_6$), praseodymium boride ($PrB_6$), neodymium boride ($NdB_6$), cerium boride ($CeB_6$), terbium boride ($TbB_6$), dysprosium boride ($DyB_6$), holmium boride ($HoB_6$), yttrium boride ($YB_6$), samarium boride ($SmB_6$), europium boride ($EuB_6$), erbium boride ($ErB_6$), thulium boride ($TmB_6$), ytterbium boride ($YbB_6$), lutetium boride ($LuB_6$), strontium boride ($SrB_6$), calcium boride ($CaB_6$), titanium boride ($TiB_2$), zirconium boride ($ZrB_2$), hafnium boride ($HfB_2$), vanadium boride ($VB_2$), tantalum boride ($TaB_2$), chromium boride ($CrB$ and $CrB_2$), molybdenum boride ($MoB_2$, $Mo_2B_5$ and $MoB$), tungsten boride ($W_2B_5$), or combinations of at least two of these borides. Very particular preference is given to borides based on lanthanum hexaboride ($LaB_6$) or mixtures comprising lanthanum hexaboride.

The particle diameter (ascertained by TEM/transmission electron microscopy) of the inorganic IR absorbers is preferably less than 200 nm, further preferably less than 100 nm and more preferably less than 50 nm, with a particle diameter in each case is preferably greater than 5 nm, further preferably greater than 10 nm. In a particularly preferred embodiment, the average particle diameter is between 15 nm and 25 nm. The particles are transparent in the visible region of the spectrum, "transparent" meaning that the absorption of these IR absorbers in the visible region of light is low compared to the absorption in the IR region, and the IR absorber does not lead to any distinctly increased haze or distinct reduction in transmission (in the visible region of light) of the composition or the respective end product.

The surface of the IR absorber particles may have been treated. For instance, the surface may have been treated with a silane or provided with a titanium-based, zirconium-based layer or similar layers. This treatment can increase resistance to moisture. This type of treatment increases long-term stability with regard to IR absorption and is described, for example, in US 2005/0161642. In a preferred embodiment, the boride- or tungstate-based IR absorber particles have been coated with titanium nitride.

Particular preference is given to using mixtures of $LaB_6$ with cesium tungstate.

The ratio of $LaB_6$ to cesium tungstate is preferably from 1:6 to 1:12, further preferably from 1:8 to 1:10.

The ratios are each based on the solids content of the pure IR absorber.

Suitable additional organic infrared absorbers are described in substance classes, for example, in M. Matsuoka, Infrared Absorbing Dyes, Plenum Press, New York, 1990.

Among these, quaterrylenes, perylenes, phthalocyanines and naphthalocyanines are particularly suitable.

Owing to improved solubility in thermoplastics, phthalocyanines and naphthalocyanines having sterically demanding side groups are preferable, for example phenyl, phenoxy, alkylphenol, alkylphenoxy, tert-butyl, (—S-phenyl), —NH-aryl, —NH-alkyl and similar groups.

Especially preferred is Lumogen IR 765 (CAS No. 943969-69-5; EC No. 454-270-3), Lumogen IR 788 (EC No. 451-660-5/CAS No. 333304-54-4) from BASF Ludwigshafen and Excolor HA 1 ((octaanilinooctafluorophthalocyanato)oxovanadium) from Nippon Shokubai.

According to the present invention, carbon black is a black pulverulent solid which, according to quality and use, consists essentially of carbon. The carbon content of carbon black is generally 80.0% to 99.9% by weight. In the case of carbon blacks that have not been subjected to oxidative aftertreatment, the carbon content is preferably 96.0% to 95.5% by weight. By extracting the carbon black with organic solvents, for example with toluene, it is possible to remove traces of organic impurities on the carbon black and hence to increase the carbon content even to greater than 99.9% by weight. In the case of oxidatively aftertreated carbon blacks, the oxygen content may be up to 30% by weight, preferably up to 20% by weight, especially 5% to 15% by weight.

Carbon black consists of usually spherical primary particles having a size of preferably 10 to 500 nm. These primary particles have fused together to form catenated or branched aggregates. The aggregates are generally the smallest units of carbon black divisible in a dispersion process. Many of these aggregates combine again as a result of intermolecular (van der Waals) forces to give agglomerates. By the variation of the production conditions, it is possible to control both the size of the primary particles and the aggregation (structure) thereof. Structure is understood by the person skilled in the art to mean the nature of the three-dimensional arrangement of the primary particles in an aggregate. Carbon blacks with highly branched and cross-linked aggregate structures are referred to as having "high structure"; by contrast, those with largely linear aggregate structures, i.e. with a low level of branching and crosslinking, are referred to as having "low structure".

A measure reported for the structure of a carbon black is generally the oil adsorption number measured to ISO 4656 with dibutyl phthalate (DBP). A high oil adsorption number is an indicator of high structure.

The primary particle size of a carbon black can be ascertained, for example, by means of scanning electron microscopy. An alternative measure of the primary particle size of a carbon black is the BET surface area of the carbon black, determined to ISO 4652 by nitrogen adsorption. A high BET surface area is an indicator of a small primary particle size.

The dispersibility of the agglomerates of a carbon black depends on the primary particle size and the structure of the aggregates, and there is generally a decrease in the dispersibility of the carbon black with decreasing primary particle size and decreasing structure.

Industrial carbon black is produced as an industrial product by incomplete combustion or pyrolysis of hydrocarbons. Processes for producing industrial carbon black are known from the literature. Known processes for producing industrial carbon blacks are especially the furnace black, gas black, lamp black, acetylene black and thermal black processes.

The particle size distribution of the primary particles and the size and structure of the primary particle aggregates determine the properties such as color depth, base hue and conductivity of the carbon black. In general, conductive blacks have small primary particles and widely branched aggregates. Color blacks are generally carbon blacks having very small primary particles and are often subjected to a subsequent oxidation after production by one of the aforementioned processes. The oxidic groups that have thus been applied to the carbon black surface are intended to increase compatibility with the resins in which the color blacks are to be introduced and dispersed.

Preference is given to using color blacks. In a preferred embodiment, these have an average primary particle size, determined by scanning electron microscopy, of less than 100 nm, preferably of 10 to 99 nm, further preferably of 10 to 50 nm, more preferably of 10 to 30 nm, especially of 10 to 20 nm. The particularly finely divided color blacks are therefore particularly preferred in the process of the invention since the color depth and UV stability achievable with a particular amount of carbon black increases with decreasing primary particle size, but on the other hand there is also a decrease in the dispersibility thereof, and for that reason such ultrafine carbon blacks in particular are in need of improvement in relation to dispersibility.

The color blacks used with preference have a BET surface area determined to ISO 4652 by nitrogen adsorption of preferably at least 20 $m^2/g$, further preferably of at least 50 $m^2/g$, more preferably of at least 100 $m^2/g$, especially of at least 150 $m^2/g$.

Color blacks used with preference are further characterized by an oil absorption number measured to ISO 4656 with dibutyl phthalate (DBP) of preferably 10 to 200 mL/100 g, further preferably of 30 to 150 mL/100 g, especially preferably of 40 to 120 mL/100 g, in particular of 40 to 80 mL/100 g. The color blacks having a low oil adsorption number generally achieve better color depth and are preferred in that respect, but on the other hand are generally more difficult to disperse, and for that reason such carbon blacks in particular are in need of improvement in relation to dispersibility.

The carbon blacks used may be and are preferably used in pelletized or bead form. The beading or pelletization is effected by methods known in the literature and serves firstly to increase bulk density and for better dosage (flow) properties, but secondly also for occupational hygiene. The hardness of the pellets or beads is preferably adjusted such that they withstand transport and conveying processes in the course of dosage in largely undamaged form, but on the other hand break down again completely into the agglomerates under the action of greater mechanical shear forces as occur, for example, in commercial powder mixing equipment and/or compounding aggregates.

Commercially available carbon blacks that are suitable in the context of the invention are obtainable in a multitude of trade names and forms, such as pellets or powders. For instance, suitable carbon blacks are available under the BLACK PEARLS® trade names, as wet-processed pellets under the ELFTEX®, REGAL® and CSX® names, and in a flaky form as MONARCH®, ELFTEX®, REGAL® and MOGUL®, all obtainable from Cabot Corporation.

Especially preferred are carbon blacks that are traded under the BLACK PEARLS® trade name (CAS No. 1333-86-4).

Carbon blacks in the context of the present invention, aside from their coloring effect, should also be regarded as IR absorbers.

The IR absorbers, especially preferably inorganic IR absorbers, may also be used in the form of mixtures with one another. In the case of mixtures, preference is given to compositions containing two to five (inclusive) and more preferably two or three different IR absorbers.

The IR absorbers may be combined such that a maximum absorption region is covered by the maxima of the individual IR absorbers.

In a further preferred embodiment, the additive that absorbs infrared radiation is present in the construction material in an amount of ≥0.0005% by weight to ≤3% by weight (preferably ≥0.005% by weight to ≤2.5% by weight, ≥0.01% by weight to ≤2% by weight), based on the total weight of the construction material.

In a further preferred embodiment, during the production of the article by means of the additive manufacturing method from the construction material, an infrared radiation source irradiates the construction material with infrared radiation. Preferably, the surface of an already formed layer of the construction material is selectively irradiated and hence selectively heated.

In a further preferred embodiment, the construction material includes a polycarbonate having a weight-average molecular weight $M_w$ of ≥25 000 g/mol to ≤40 000 g/mol. The molecular weight is determined by gel permeation chromatography in methylene chloride at 25° C. against polycarbonate standards.

In a further preferred embodiment, the production of the article by means of the additive manufacturing method comprises the steps of:
  applying a layer of particles including the construction material to a target surface;
  introducing energy into a selected portion of the layer corresponding to a cross section of the article such that the particles in the selected portion are bonded;
  repeating the steps of applying and introducing energy for a multitude of layers, such that the bonded portions of the adjacent layers become bonded in order to form the article.

This embodiment involves a powder sintering or powder fusion method. If the number of repetitions for applying and irradiation is sufficiently low, it is also possible to make reference to a two-dimensional article which is to be constructed. Such a two-dimensional article can also be characterized as a coating. For example, for construction thereof, ≥2 to ≤20 repetitions for applying and irradiating may be conducted.

It is preferable that at least 90% by weight of the particles have a particle diameter of ≤0.25 mm, preferably ≤0.2 mm, more preferably ≤0.15 mm. The energy source for bonding of the particles may be electromagnetic energy, for example UV to IR light. An electron beam is also conceivable. The bonding of the particles in the irradiated portion of the particle layer is typically effected through (partial) melting of a (semi-)crystalline material and bonding of the material in the course of cooling. Alternatively, it is possible that other transformations of the particles such as a glass transition, i.e. the heating of the material to a temperature above the glass transition temperature, bring about bonding of the particles of the particles to one another.

In a further preferred embodiment, the introducing of energy into a selected portion of the layer corresponding to a cross section of the article such that the particles in the selected portion are bonded comprises the following step:
  irradiating a selected portion of the layer corresponding to a cross section of the article with a beam of energy, such that the particles in the selected portion are bonded.

This form of the method can be regarded as a selective sintering method, especially as a selective laser sintering method (SLS). The beam of energy for bonding of the particles may be a beam of electromagnetic energy, for example a "light beam" of UV to IR light. Preferably, the beam of energy is a laser beam, more preferably having a wavelength between 600 nm and 15 μm. The laser may take the form of a semiconductor laser or of a gas laser. An electron beam is also conceivable. Preferably, the energy is introduced by means of an IR laser, and so the at least temporary exposure of the construction material envisaged in accordance with the invention with infrared radiation in the wavelength range between 600 nm and 1700 nm is implemented thereby.

In a further preferred embodiment, the production of the article by means of the additive manufacturing method comprises the steps of:
  applying a filament of an at least partly molten construction material to a carrier, such that a layer of the construction material is obtained, corresponding to a first selected cross section of the article;
  optionally applying a filament of the at least partly molten construction material to a previously applied layer of the construction material, such that a further layer of the construction material is obtained, which corresponds to a further selected cross section of the article and which is bonded to the layer applied beforehand;
  optionally repeating the step of applying a filament of the at least partly molten construction material to a previously applied layer of the construction material until the article has been formed.

This embodiment is a melt coating or fused deposition modelling (FDM) method. If the number of repetitions for the applying is sufficiently low, it is also possible to make reference to a two-dimensional article which is to be constructed. Such a two-dimensional article can also be characterized as a coating. For example, for construction thereof, ≥1 to ≤20 repetitions for the application can be conducted.

The individual filaments which are applied may have a diameter of ≥30 μm to ≤2000 μm, preferably ≥40 μm to ≤1000 μm and more preferably ≥50 μm to ≤500 μm.

The first step of this embodiment of the method relates to the construction of the first layer on a carrier. Subsequently, the second step, in which further layers are applied to previously applied layers of the construction material, is executed until the desired end result in the form of the article is obtained. The at least partly molten construction material bonds to existing layers of the material in order to form a structure in z direction. But it is possible that just one layer of the construction material is applied to a carrier. In this embodiment, the layer of the construction material applied last in each case is exposed to the IR radiation envisaged in accordance with the invention by means of an IR radiation source such as a Nernst pin, globar, chromium-nickel alloys, high-pressure mercury vapor lamps or tungsten lamps.

In a further preferred embodiment, the process is conducted within a construction space and the temperature of the construction space is ≥10° C. (preferably ≥25° C., more preferably ≥50° C.) lower than the glass transition temperature $T_g$ of the construction material (determined by DSC to DIN EN ISO 11357 at a heating rate 10° C./min). Particularly in the case of complex and large components with long manufacturing time, this is associated with distinctly lower thermal stress and better trueness of the component to scale. In powder sintering methods, the powders can be processed at distinctly lower construction space temperature. Thus, unwanted sintering of powder beneath the (activated) surface can be avoided.

In a further preferred embodiment, the surface temperature of a layer of the construction material applied last in the additive manufacturing method is not less than a temperature which, in a dynamic-mechanical analysis of the construction material (to ISO 6721-10 at an angular frequency of 1/s), corresponds to a point of intersection of a theoretical straight line in the section of the curve of the storage modulus E' corresponding to a vitreous state of the construction material and a theoretical straight line in the section of the curve of the storage modulus E' in which the storage modulus E' declines and indicates a glass transition. This temperature is also referred to in the literature as "onset" temperature in the determination of the glass transition temperature using the E' curve in a dynamic-mechanical analysis.

In a further preferred embodiment, during the process, the temperature of the construction material deposited decreases from the surface down to lower layers. For instance, in a particularly preferred embodiment, the tenth layer beneath the uppermost layer has a temperature ≤3° C., preferably ≤5° C. and more preferably ≤8° C. below the temperature of the uppermost layer.

A further aspect of the present invention is an article obtained by a process of the invention, wherein the article has been produced from a construction material which is a polymer selected from the group of: (co)polycarbonates, polyesters, polyestercarbonates, polyformals, polyamides, polyethers, polyvinylchloride, polymethyl(meth)acrylate, polystyrene or a combination of at least two of these and an additive that absorbs infrared radiation, and wherein the article, in construction direction of the additive manufacturing method used in the production thereof, has a tensile strength (ISO 527) of ≥30% (preferably ≥40%, more preferably ≥50%) to ≤100% of the tensile strength (ISO 527) of an injection-molded specimen made from the same construction material. These tensile strengths in the additively manufactured article thus relate to the adhesion of individual layers of the construction material to one another.

EXAMPLES

There follows a detailed description of the invention with reference to working examples, the methods of determination described here being used for all corresponding parameters in the present invention unless stated otherwise.

IR Absorber KHDS 872-G2 is lanthanum hexaboride was sourced from "Sumitomo Metal Mining Co. Ltd."

Makrolon® 3108 polycarbonate as per datasheet, 30 Nov. 2017 edition, was sourced from Covestro Deutschland AG.

Example 1: Production or Pulverulent Construction Materials

The following two powders were produced:
Powder 1: was produced from Makrolon® 3108 by cryogenic grinding ($d_{50}$=73 μm).
Powder 2: was produced by mixing powder 1 with 0.01% by weight of KHDS 872-G2 IR absorber and homogenized in an overhead mixer.

The cryogenic grinding of the Makrolon® 3108 was established in a cone-shaped (rotor/stator) mill with liquid nitrogen. For this purpose, Makrolon® 3108 granules were precooled with liquid nitrogen and introduced into the mill with a large excess of nitrogen in order not to allow the temperature to rise above −80° C. during the grinding. The grinding product was then sieved through at least one sieve having a size of 125 μm. 50% by weight of the powder had a diameter of less than about 73 μm (measured by means of laser diffraction with HELOS particle size analysis).

Powders 1 and 2 were each introduced separately into an aluminum dish to a height of about 5 mm. Both powders were exposed to near infrared (NIR) radiation. For this purpose, the Cefla Finishing Drycoat 300P drier was used. The powders were exposed to the NIR light for 50 s; the power of the NIR source was 20 kW. An irradiation area of 50 cm×200 cm in the drier results in a power density of about 2 W/cm². The air temperature in the drier during the irradiation was between 110° C. and 120° C.

By contrast with powder 1 which remained in the pulverulent state as originally introduced after irradiation, the surface of powder 2 had sintered together. A film with a layer thickness of about 1 mm had been formed.

In this way, it was shown that only inventive powder 2 is sintered under the conditions chosen, whereas non-inventive powder 1 remains in the original powder state.

Example 2

Powder 2 according to example 1 was introduced into an aluminum dish to a height of about 5 mm. Half the dish was covered with an aluminum lid. The dish was exposed to NIR radiation in a Cefla Finishing Drycoat 300P drier. The powder was exposed to the NIR light for 50 s; the power of the NIR source was 20 kW.

In the region in which the powder was exposed directly to the IR radiation without a cover, the surface of the powder had sintered together. A thin film with a layer thickness of about 1 mm had formed.

In the region in which the powder was covered and not exposed directly to the IR radiation, the powder had remained in the loose state as originally introduced.

The invention claimed is:
1. A process for producing an article, comprising:
producing the article by means of an additive manufacturing method from a construction material, comprising
applying a filament of an at least partly molten construction material to a carrier, such that a layer of the construction material is obtained, corresponding to a first selected cross section of the article;
optionally applying the filament of the at least partly molten construction material to a previously applied layer of the construction material, such that a further layer of the construction material is obtained, which corresponds to a further selected cross section of the article and which is bonded to the layer applied beforehand; and optionally repeating the step of applying the filament of the at least partly molten construction material to a previously applied layer of the construction material until the article has been formed, wherein the construction material comprises a polymer comprising (co)polycarbonates, polyesters, polyester-carbonates, polyformals, polyamides, polyethers, polyvinylchloride, polymethyl(meth)acrylate, polystyrene, or a combination of at least two of these and an additive that absorbs infrared radiation, wherein the additive that absorbs infrared radiation is present at a surface of the construction material, and wherein the additive that absorbs infrared radiation is selected to reduce transmittance of the construction material for light in a wavelength range between 600 nm and 1700 nm, determined on a 100 μm-thick sample, by >2.5 percentage points compared to a sample of the construction material having a thickness of 100 μm that does not contain the additive that absorbs infrared radiation, and wherein, during the additive manufacturing method, the construction material is at least temporarily exposed to infrared radiation in the wavelength range between 600 nm and 1700 nm.

2. The process as claimed in claim 1, wherein the additive that absorbs infrared radiation is distributed within the construction material.

3. The process as claimed in claim 1, wherein the additive that absorbs infrared radiation comprises borides, tungstates, mixtures of at least one boride and at least one tungstate, carbon black, organic IR absorbers, or a combination of at least two of these.

4. The process as claimed in claim 1, wherein the additive that absorbs infrared radiation is present in the construction material in an amount of 0.0005% by weight to 3% by weight, based on a total weight of the construction material.

5. The process as claimed in claim 1, wherein, during the production of the article, an infrared radiation source irradiates the construction material with infrared radiation.

6. The process as claimed in claim 1, wherein the construction material includes a polycarbonate having a weight-average molecular weight of ≥25 000 g/mol to ≤40 000 g/mol.

7. The process as claimed in claim 1, wherein the process is conducted within a construction space and a temperature of the construction space is 10° C. lower than a glass transition temperature $T_g$ of the construction material (determined by DSC to DIN EN ISO 11357 at heating rate 10° C./min).

8. The process as claimed in claim 1, wherein a surface temperature of a layer of the construction material applied last in the additive manufacturing method is not less than a temperature which, in a dynamic-mechanical analysis of the construction material (according to ISO 6721-10 at an angular frequency of 1/s), corresponds to a point of intersection of a theoretical straight line in the section of the curve of the storage modulus E' corresponding to a vitreous state of the construction material and a theoretical straight line in the section of the curve of the storage modulus E' in which the storage modulus E' declines and indicates a glass transition.

* * * * *